UNITED STATES PATENT OFFICE.

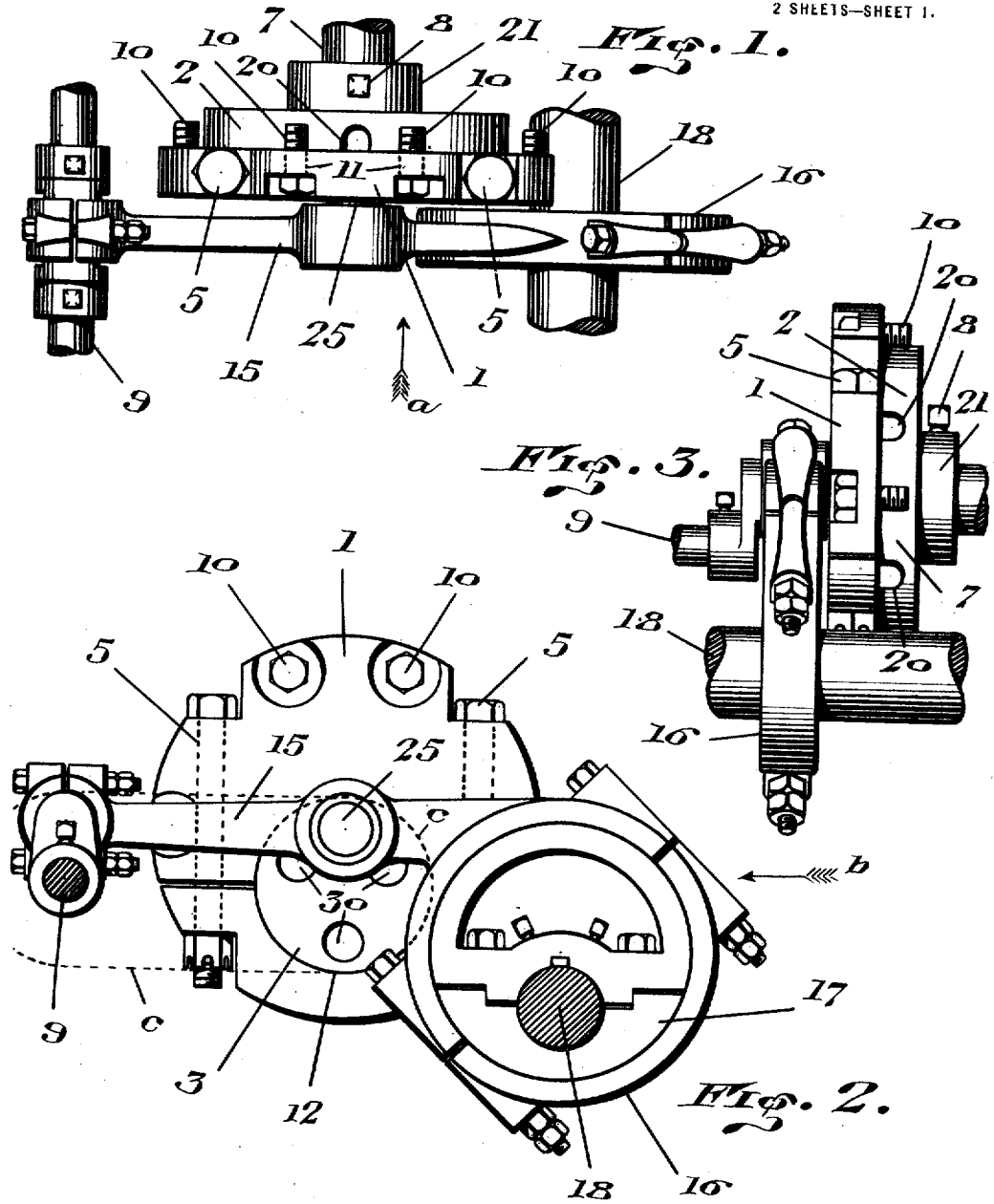

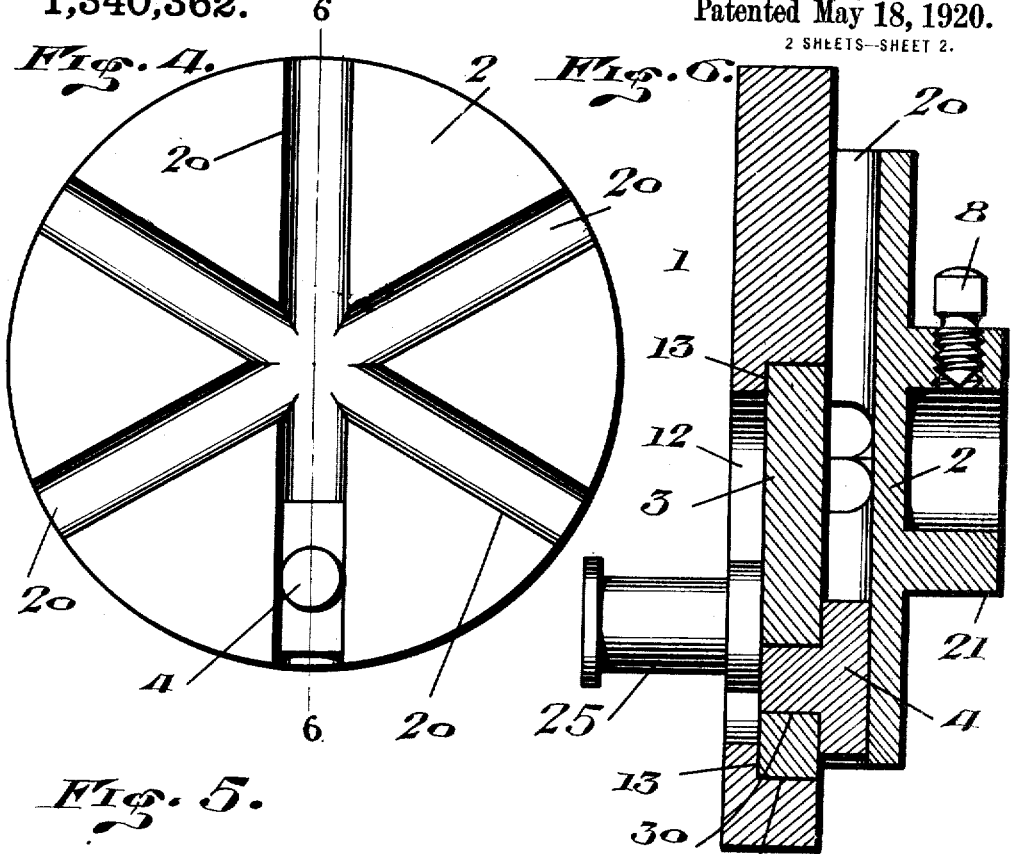

AVERY BARNES, OF DANVILLE, ILLINOIS.

VALVE-TIMING GEAR FOR EXPLOSIVE-ENGINES.

1,340,362.   Specification of Letters Patent.   Patented May 18, 1920.

Application filed August 22, 1919. Serial No. 319,253.

*To all whom it may concern:*

Be it known that I, AVERY BARNES, a citizen of the United States, residing at Danville, in the county of Vermilion and State of Illinois, have invented a new and Improved Valve-Timing Gear for Explosive-Engines, of which the following is a specification.

This invention has reference to that type of mechanical movements in which trammel gear devices are included in the connections that join a driving shaft and a driven shaft for transmitting multiplied motion to the said driven shaft, and my said invention primarily has for its object to provide an improved means of the general character stated, of a simple and economical construction, more especially designed for use in connection with internal combustion engines and especially designed for imparting rotation to the cam operating shaft one-half as fast as the engine crank shaft, to thereby operate the valves in turn, as they should be on any engine using cams to operate the valve.

Another object of my invention is to provide, in a power transmission of the general character stated, a compact arrangement of the parts connecting the engine crank shaft and the cam shaft, in which the said parts are operatively so combined that they run practically noiseless and by which irregularities of motion, as the crank passes over the dead centers, is substantially eliminated.

With other objects in view that will hereinafter appear, my invention embodies, in a valve timing gear of the character described, the novel features of construction and peculiar arrangement of parts, stated in detail in the following description thereof, specifically pointed out in the appended claims and illustrated in the accompanying drawings, in which:

Figure 1 is a top plan view of my valve timing gear mechanism, so much of the engine crank or drive shaft, the cam shaft and the pump shaft being shown as is necessary to illustrate a practical application of my invention.

Fig. 2 is a front elevation thereof, looking in the direction of the arrow *a*.

Fig. 3 is an end view of the same looking in the direction of the arrow *b*.

Fig. 4 is a face of the trammel disk.

Fig. 5 is a transverse section of the said disk.

Fig. 6 is a vertical section thereof on the line 6—6 on Fig. 4, the stationary support or framing and the wrist pin carrying eccentric and its trammel groove engaging guide being shown in their coöperative positions.

Fig. 7 is a detail section of the eccentric member.

Fig. 8 is a perspective view of one of the trammel groove engaging guides.

In the practical arrangement of my invention, the gear mechanism includes a main or body portion 1, preferably of substantially disk shape and comprising two parts, one of which, preferably the upper in practice, is secured to the engine frame by cap screws 10 that are projected through the four outside apertures 11 in the said upper part of the body 1, as indicated in Fig. 1.

The lower part of the body portion 1 is secured to the upper part by the long bolts 5—5.

The body portion 1 has an opening 12, which opening is of different diameters, whereby an annular thrust collar 13 is provided within the opening, the purpose of which will presently appear.

3 designates what is hereinafter termed the crank disk and it is of a diameter to snugly seat within that portion of the opening 12 of the larger diameter, as is clearly shown in Fig. 5, by reference to which it will be also noticed the said disk 3 may move in a rotary motion within the opening 2 but is held from end thrust by the collar 13.

2 designates what I term the trammel disk and it has a finished face that moves against the rear face of the disk-like body 1 and the said trammel disk 2 is planed out to provide a series of trammel grooves 20 that extend across that face of the disk 2 which engages the body 1, as shown.

The disk 3, which fits in the body 1, as above stated, has three apertures 30 spaced 120 degrees apart and which constitute bearings for the trammel groove engaging guides 4, the shape of which is best shown in detail in Fig. 7.

The trammel disk 2 has a collar 21 on the outer face thereof to receive the end of the cam shaft 7, to which, in practice, it is secured by a clamp screw 8 and a key (not shown).

The inner face of the disk 2 is finished for engaging the body portion 1, as before stated, and it is fitted with a wrist pin 25. The pin 25 is fixedly attached to the crank disk or cam 3 and, when my invention is used in connection with a pump or fan shaft 9, as shown in Figs. 1, 2 and 3, the said pin 25 rotates in a circle in horizontal alinement with the circular path of movement of the crank of the pump shaft 9, see dotted lines c on Fig. 2.

15 designates a solid arm that extends tangentially from and is cast on the strap 16 that takes around the eccentric 17 on the engine crank 18, as is best shown in Fig. 2.

The solid arm 15 has two bearings, one of which is a kick bearing to receive the wrist pin of the eccentric or trammel disk 3 and one a split bearing to receive the crank of the pump shaft of the engine.

The arrangement of the parts, as shown and described, provides for the following action, when in operation:

As the engine crank is rotated, the eccentric 17 will transmit, through the strap 16, rotary motion to the wrist pin 30 of the disk 3 and at the same time impart rotation to the crank of the pump shaft, it being understood that the several parts just referred to move at the same rate of speed.

The action of the trammel now takes place, which, through the connection described and shown, will cause the cam shaft to move one-half as fast as the engine crank shaft, thereby operating the valves in turn.

In the drawings I have shown the pump shaft 9 as extended at both sides of the crank, one side to operate the pump and the other to operate the fan pulley.

It is understood that the form of construction shown may be easily modified or changed to conform to any design of machine to which my invention is to be applied without departing from my said invention and as comes within the scope of the appended claims.

From the foregoing description taken in connection with the drawings, the complete construction, the manner of operation and the advantages of my invention will be readily understood by those skilled in the art to which my invention relates and therefore need not be further explained.

What I claim is:

1. The combination with the crank shaft and the cam shaft of an engine; of a trammel gear connection between the said shafts for driving the cam shaft from the crank shaft.

2. The combination with the crank shaft and the cam shaft of an engine and a rotatably mounted crank disk; of an arm and eccentric connection that joins the crank shaft and the crank disk, and a trammel disk connection that joins with the said crank disk and the said cam shaft.

3. The combination with the crank shaft and the cam shaft of an engine and a rotatably mounted crank disk; of an arm and eccentric connection that joins the crank shaft and the crank disk and a trammel disk connection that joins with the said crank disk and the said cam shaft, the said connection comprising a supporting member having an opening within which the crank disk is mounted and a thrust collar engaging the disk, another disk having radially extended and axially merging grooves at one side thereof, and means for coupling with the cam shaft at the other side, and a guide carried by the crank disk adapted for slidably engaging the grooves in the disk held on the cam shaft.

4. The combination with the crank, the cam, and the pump shafts of an engine; of means for imparting motion of like speed to the crank and pump shafts and a different speed of motion to the cam shaft, the said means comprising an eccentric on the crank shaft, an arm projected from the band of the eccentric and connected at the outer end to the crank of the pump shaft, whereby to rotate the pump shaft at the same rate of speed of the crank shaft, a support, a crank disk rotatably mounted within the support, another disk connected with the cam shaft and having trammel grooves in one face that travels over the coincident face of the support, a trammel groove engaging member carried by the crank disk, the latter having its wrist pin extended into the lever that connects the crank shaft eccentric and the pump shaft crank.

AVERY BARNES.